O. PADDOCK.

Hot Air Furnace.

No. 1,574. Reissued Nov. 24, 1863.

Witnesses
J. W. Crombo
R. S. Spencer

Inventor
Oscar Paddock
per Munn & Co
attorneys

N. PETERS, Photo-Lithographer, Washington, D. C.

UNITED STATES PATENT OFFICE.

OSCAR PADDOCK, OF WATERTOWN, NEW YORK.

IMPROVEMENT IN HOT-AIR FURNACES.

Specification forming part of Letters Patent No. 30,752, dated November 27, 1860; Reissue No. 1,574, dated November 24, 1863.

DIVISION A.

*To all whom it may concern:*

Be it known that I, OSCAR PADDOCK, of Watertown, in the county of Jefferson and State of New York, have invented a new and useful Improvement in Hot-Air Furnaces; and I do hereby declare that the following is a full, clear, and exact description thereof, reference being had to the accompanying drawings, making a part of this specification.

The present invention relates more particularly to a mechanism for operating valves of hot-air furnaces; and it consists in a method of operating valves automatically by opening or closing the furnace-door, at the same time affording the means to operate them by hand at the pleasure of the attendant.

Figure 1:
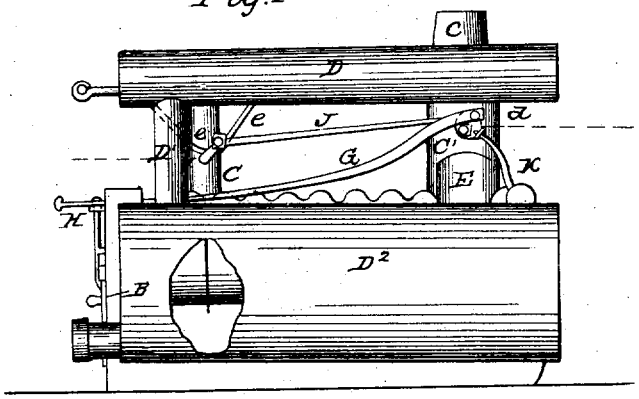
Figure 2:
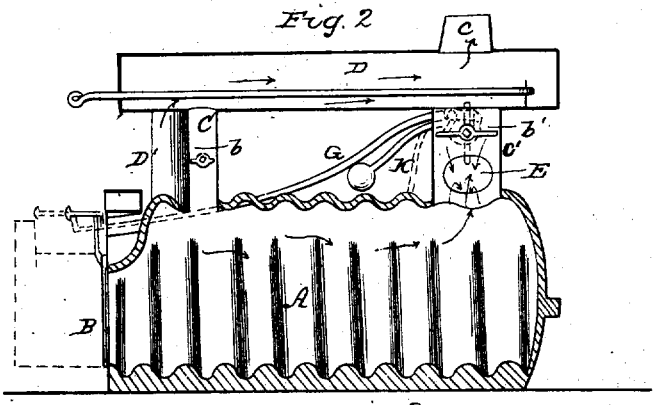
Figure 3:
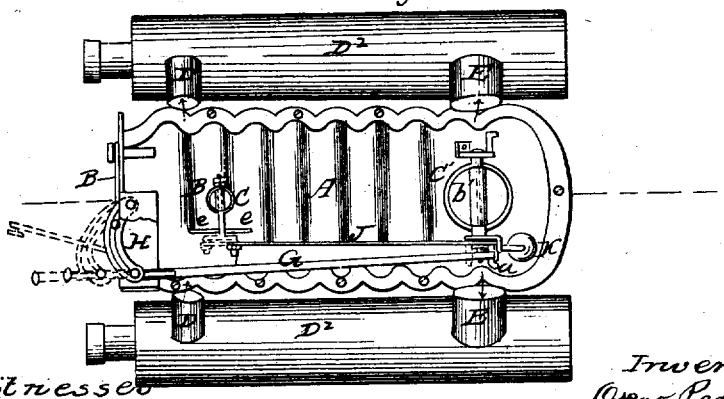

In the accompanying drawings, Figure 1 is a side elevation of a hot-air furnace with the improved valve arrangement applied to it. Fig. 2 is a vertical section through the furnace with a valve arrangement constructed in accordance with my said invention applied to the left-hand side of the furnace. Fig. 3 is a section taken in the horizontal plane indicated by the red lines *x x* in Fig. 1, and showing a valve arrangement also constructed in accordance with my said invention applied to the right-hand side of the furnace.

The two arrangements are the mechanical equivalents of each other as respects the principle of the invention, and either may be adopted with same effect.

To illustrate this my invention, I have shown it applied to a hot-air furnace or stove of a peculiar construction of my own; but I would here observe that it is applicable to any kind of furnace or stove in which it is an object to prevent the escape of smoke from the door of the stove when the door is opened for replenishing the fire or for other purposes.

To enable those skilled in the art to make and use my invention, I will proceed to describe its construction.

A is the shell around the fire-chamber, which has a door, B, in its front end, and two vertical pipes, C C′, proceeding up from the top and near the front and rear ends. On top of these two pipes C C′ rests a horizontal drum, D, and from each side of the front end of this drum is a branch pipe, D′, each of which communicates with and helps to sustain the side drums, $D^2$.

E E are two branch pipes, which form communication with the pipe C′, or directly with the fire-chamber and side drum, $D^2$.

*b b′* are valves placed in the flues C C′. The valve *b′* in flue C′ is above the intersection of the pipes E E with the fire chamber or flue C′, so that when the valves are closed the smoke, &c., will pass down through the pipes E E toward the front end of the furnace, through the side flues, and thence up through pipes D′ D′, and back again through drum D to the chimney *c*; but when both valves are open there will be a direct communication between the fire-chamber and the horizontal drum D.

In starting the fire, to obtain a sufficient draft it is desirable to have both flues C C′ open, and when the door of the stove is opened to put in fuel it is also desirable to have a direct draft both at the rear and in front of the fire chamber. This draft is obtained by the auxiliary flue C, the valve *b* of which is so connected to the valve *b′* of flue C′ that they can both be opened and closed at the same time. To effect the opening and closing of the two valves at proper times I have connected them to the door B of the furnace by a rod, G, which is pivoted at one end to the bent arm *d* of the valve *b′*, and at the other end it is pivoted to a pin which projects up from one end of a pivoted slotted sector, H, in the slot of which an arm projecting from the door of the stove plays, so that the sector H is made to swing back and forth by the opening and closing of door B. The connecting-rod G is slotted in its front end, as shown in Fig. 3, and this slot plays over the pin which projects from the sector-arm, so that the rod G, and consequently the valves *b b′*, will not be directly affected by the door in closing. Only in opening the door will the rod G be moved by it; but, in order that the valves may be closed when the door is closed, a weighted arm, K, is attached to the crank-arm *d* of valve *b′*, as shown in Figs. 1 and 3, which arm rises and falls in opening and closing the door. The valves are thus opened by the door, but closed by the weight on arm K, when the door is closed.

*e e*, Figs. 1 and 3, are rods, which stop the valves when they are open or when they are closed. The slot in connecting-rod G allows an end-play to this rod sufficient to open the valves when the door of the furnace is closed. Therefore, when it is desirable to open the valves to increase combustion in the furnace, it may be done by drawing the rod *b'* forward without opening the furnace-door. The weighted arm will close the valves again in releasing the rod G.

The two valves *b b'* are connected together by a rod, J, which is pivoted to the bent arms of the valves.

Having thus described my invention, what I claim as new, and desire to secure by Letters Patent, is—

1. The mechanism herein described, or its mechanical equivalent, for automatically operating, in the manner and for the purposes set forth, valves of hot-air furnaces or other heat-generator by means of the furnace-door, the mechanism being such as to afford the means of regulating the draft in the furnace independently of the door, substantially as herein shown and described.

2. The weighted valve or damper coupled with the furnace-door under an arrangement whereby the opening or closing of said door will cause the weight to operate the valve, substantially in the manner and for the purposes set forth.

3. Combining the weighted valve with the door by means of a connecting rod so constructed or so arranged that while actuated by the door, as set forth, the valve may also be operated by hand to regulate the draft in the furnace, substantially as herein shown and described.

In testimony whereof I have signed this specification in presence of two witnesses.

OSCAR PADDOCK.

Witnesses:
B. R. MEIGS,
L. PADDOCK.